(12) United States Patent
Leclercq et al.

(10) Patent No.: US 12,447,698 B2
(45) Date of Patent: Oct. 21, 2025

(54) MACHINERY FOR WINDING A FIBROUS TEXTURED MATERIAL, AND ASSOCIATED WINDING METHOD

(71) Applicants: SAFRAN, Paris (FR); SAFRAN LANDING SYSTEMS, Velizy-Villacoublay (FR)

(72) Inventors: Sylvain Didier Leclercq, Moissy Cramayel (FR); Quentin Roirand, Moissy Cramayel (FR); Dominique Marie Christian Coupe, Moissy Cramayel (FR); Thierry Patrick Chauvin, Moissy Cramayel (FR); Nicolas Tran, Moissy Cramayel (FR)

(73) Assignees: SAFRAN, Paris (FR); SAFRAN LANDING SYSTEMS, Velizy-Villacoublay. (FR)

( * ) Notice: Subject to any disclaimer, the term of this patent is extended or adjusted under 35 U.S.C. 154(b) by 0 days.

(21) Appl. No.: 18/688,054

(22) PCT Filed: Aug. 25, 2022

(86) PCT No.: PCT/FR2022/051609
§ 371 (c)(1),
(2) Date: Feb. 29, 2024

(87) PCT Pub. No.: WO2023/031541
PCT Pub. Date: Mar. 9, 2023

(65) Prior Publication Data
US 2024/0262051 A1    Aug. 8, 2024

(30) Foreign Application Priority Data
Sep. 3, 2021    (FR) ..................................... 2109247

(51) Int. Cl.
*B29C 33/48* (2006.01)
*B29C 70/24* (2006.01)
(Continued)

(52) U.S. Cl.
CPC ............ *B29C 70/347* (2013.01); *B29C 70/24* (2013.01); *B29C 70/32* (2013.01); *B29K 2105/0845* (2013.01)

(58) Field of Classification Search
CPC ..... B29C 33/485; B29C 33/48; B29C 70/347; B29C 70/32
See application file for complete search history.

(56) References Cited

U.S. PATENT DOCUMENTS

| | | | | | |
|---|---|---|---|---|---|
| 3,057,767 | A | * | 10/1962 | Kaplan | B29C 70/86 |
| | | | | | 273/DIG. 7 |
| 4,207,052 | A | * | 6/1980 | Satzler | B29D 23/00 |
| | | | | | 249/142 |

(Continued)

FOREIGN PATENT DOCUMENTS

| | | |
|---|---|---|
| CA | 3 070 779 A1 | 7/2021 |
| CN | 101209591 A | 7/2008 |

(Continued)

OTHER PUBLICATIONS

Written Opinion of the International Searching Authority as issued in International Patent Application No. PCT/FR2022/051609, dated Dec. 12, 2022.

(Continued)

*Primary Examiner* — Matthew J Daniels
(74) *Attorney, Agent, or Firm* — Pillsbury Winthrop Shaw Pittman LLP (57) ABSTRACT

A tooling for winding a fibrous fabric on a support, allowing gradual modification of the shape of the support as winding (Continued)

progresses, and includes compaction devices to reduce wrinkling of the fabric obtained after compaction.

15 Claims, 5 Drawing Sheets

(51) Int. Cl.
    *B29C 70/32* (2006.01)
    *B29C 70/34* (2006.01)
    *B29K 105/08* (2006.01)

(56) References Cited

U.S. PATENT DOCUMENTS

| | | | |
|---|---|---|---|
| 4,908,090 A * | 3/1990 | Kozachevsky | B29C 33/76 425/35 |
| 2008/0160122 A1 | 7/2008 | Blanton et al. | |
| 2013/0149491 A1 | 6/2013 | Wakeman et al. | |
| 2015/0174833 A1 | 6/2015 | Desjoyeaux | |
| 2015/0292550 A1 | 10/2015 | Streckel | |
| 2018/0281228 A1 | 10/2018 | Godon et al. | |
| 2021/0379844 A1 * | 12/2021 | Fabre | B29C 70/462 |

FOREIGN PATENT DOCUMENTS

| | | | |
|---|---|---|---|
| CN | 108137416 A | 6/2018 | |
| CN | 113021939 A | 6/2021 | |
| CN | 113043621 A | 6/2021 | |
| DE | 10 2011 000105 A1 | 8/2011 | |
| FR | 2 543 054 A1 | 9/1984 | |
| FR | 2 930 611 A1 | 10/2009 | |
| FR | 2 995 557 A1 | 3/2014 | |
| FR | 3 066 429 A1 | 11/2018 | |
| WO | WO 01/77771 A1 | 10/2001 | |
| WO | WO 2012/054731 A2 | 4/2012 | |
| WO | WO-2020081802 A1 * | 4/2020 | B29C 70/46 |

OTHER PUBLICATIONS

International Search Report as issued in International Patent Application No. PCT/FR2022/051609, dated Dec. 12, 2022.
First Office Action as issued in Chinese Patent Application No. 202280066416.6, dated Jul. 11, 2024.

* cited by examiner

MACHINERY FOR WINDING A FIBROUS TEXTURED MATERIAL, AND ASSOCIATED WINDING METHOD

CROSS-REFERENCE TO RELATED APPLICATIONS

This application is the U.S. National Stage of PCT/FR2022/051609, filed Aug. 25, 2022, which in turn claims priority to French patent application number 21 09247 filed Sep. 3, 2021. The content of these applications are incorporated herein by reference in their entireties.

TECHNICAL FIELD

The present disclosure relates to tooling for winding a fibrous fabric, fabricated in particular by three-dimensional weaving, to obtain a fibrous preform of a part in composite material, and to an associated winding method. The invention applies to the manufacture of parts useful in different fields and of varied shapes, in particular for the manufacture of aircraft parts, such as landing gear or gas turbine parts.

PRIOR ART

Figure 1:
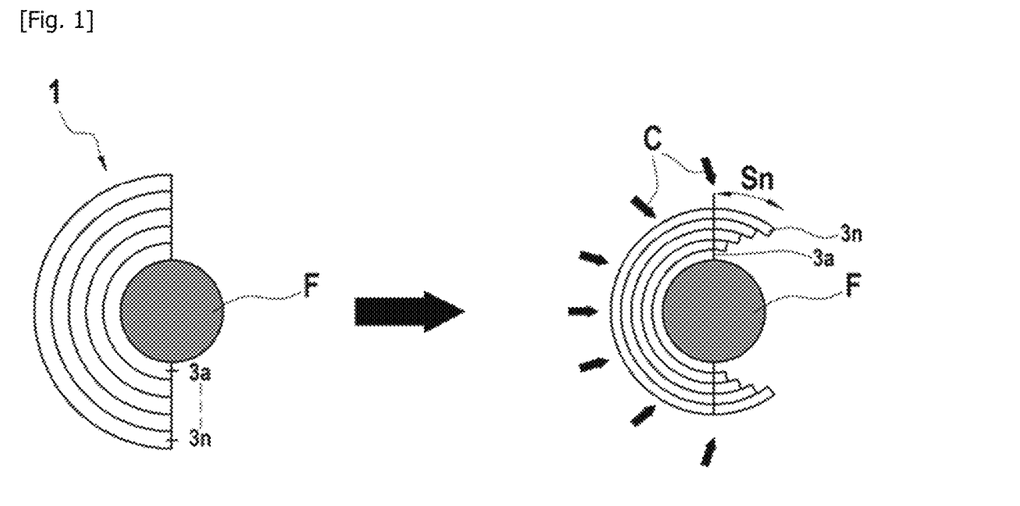
FIG. 1 schematically illustrates the generating of overlengths when compacting a winding of layers of fibrous fabric, having a locally circular shape.
Figure 2:
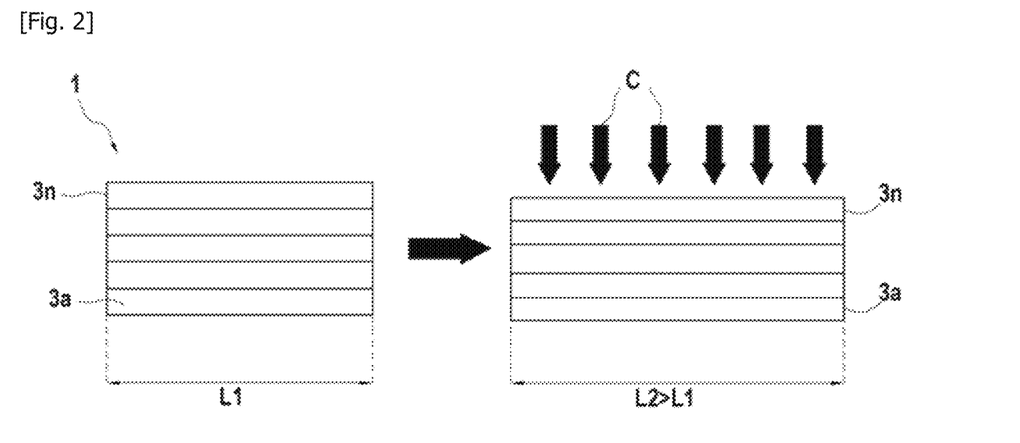
FIG. 2 schematically illustrates the generating of overlengths when compacting a winding of layers of fibrous fabric, having a locally rectilinear shape.

The manufacture of parts in composite material by winding a fibrous fabric on a support and the subsequent insertion of a matrix material into the porosity of the fabric is known. On leaving the weaving loom, the fibrous fabric is «bulked», i.e. it has a significant free volume of porosity not occupied by fibres. In general, the bulked fibrous fabric has a fibre volume fraction that is lower than the desired fibre volume fraction in the end part. Compaction of the wound fabric is therefore carried out to reduce the thickness of each of the layers, and thereby increase the fibre volume fraction to the desired value. Nevertheless, overlengths of the fabric are generated by compaction, which lead to wrinkling of the fabric (also called local buckling defects) at the time of conforming in an injection mould, which can deteriorate the mechanical strength of the part when in operation. An illustration of the overlengths produced at the time of compaction is given in FIGS. 1 and 2. FIG. 1 concerns the case in which the wound fabric 1 has locally circular geometry. In this configuration the layers 3a-3n wound on support F, at the time of compaction symbolized by the arrows C, receive an overlength which increases the more the layer lies towards the outer side of the winding. This difference can be accounted for by the increase in the perimeter of the layers as and when winding progresses. Therefore, the overlength Sn generated for the outermost layer 3n is maximal. FIG. 2 illustrates the generation of overlengths in a wound preform 1 locally having a rectilinear shape. On this rectilinear portion. each wound layer 3a-3n receives an identical overlength at the time of compaction C causing it to change from length L1 to a length L2 greater than L1. Document CN 113 043 621 is known disclosing a method for forming an annular reinforcement, and CN 113021 939 disclosing a method for forming a component based on continuous fibres and common fibres.

It is desirable to provide tooling for the winding of a fibrous fabric together with an associated method which allow the reducing and even obviating of wrinkling defects in the compacted fabric intended to form the fibrous reinforcement of the part to be obtained.

DISCLOSURE OF THE INVENTION

The invention concerns tooling for winding a fibrous fabric, comprising at least one support on which the fibrous fabric is intended to be wound about a first axis of winding, the support having at least two end regions spaced along a second axis transverse to the first axis, characterized in that it comprises a motion device configured to modify the shape of the support between a retracted configuration and an extended configuration by gradually drawing the end regions closer or further apart along the second axis, and in that it comprises a first compaction device able to perform compaction on the end regions at least in the retracted configuration, and a second compaction device differing from the first compaction device able to perform compaction on a central region lying between the end regions in the extended configuration.

The invention proposes tooling to allow the end regions to be drawn towards each other as winding progresses i.e. on each turn of the fibrous fabric or fraction of a turn of the fibrous fabric, to adjust the perimeter of each wound layer to a predetermined value allowing the offsetting of discrepancies of generated overlengths for the different layers at the time of compaction by the first compaction device. The fabric, at each additional turn or fraction of a turn, is therefore wound by reducing the distance between the end regions to take into account the increase of the overlengths generated by compaction, this reduction continuing the more the layer becomes the outermost layer of winding (see FIG. 1) until, at the last turn, a minimum distance is reached corresponding to the so-called «retracted» configuration of the support. After compaction by the first compaction device in the retracted configuration, the distance between the end regions is increased until entering the so-called «extended» configuration in which the wound layers are tautened to remove wrinkles optionally with local compaction zones, with a distance between the end regions which substantially corresponds to a final dimension of the part to be obtained. Compaction is then continued with the second compaction device in the central region to form the fabric in this region. After compaction, a preform of the part is therefore obtained with the desired fibre volume fraction and with wrinkling defects of the fabric strongly reduced and even entirely eliminated. The invention applies to the manufacture of a fibrous reinforcement delimiting an inner volume and forming a closed contour, advantageously from a fibrous fabric obtained by three-dimensional weaving. As described below, the invention is of interest for varied geometries of parts, such as parts which alternate between elongate areas substantially extending rectilinear fashion and areas that are curved or rounded, or parts having circular or elliptic geometry.

In one example of embodiment, each end region comprises a distal end and two side portions located either side of the distal end and positioned on the side of the central region, and wherein the first compaction device comprises a first compacting element able to perform compacting on the distal end of each end region, and a second compacting element able to perform compacting on the side portions of each end region with a compacting component directed towards the central region. The application of a compacting component directed towards the central region is conducive to repelling the overlengths, generated during compaction of the end regions, towards the central region thereby further neutralizing wrinkling when changing over to the extended configuration.

In particular, the second compacting element may have at least one lateral surface forming a nonzero angle with the normal to the support at this surface.

Said characteristic advantageously takes part in repelling the overlengths, generated when compacting the end regions, towards the central region thereby further neutralizing wrinkling when changing over to the extended configuration.

The first compaction device can be configured to carry out compaction by the second compacting element after performing compaction by the first compacting element.

The performing of compaction on the end regions in sequential manner, first on the distal end and then on the side portions, further promotes repelling the overlengths towards the central region.

In one example of embodiment, the end regions define a winding surface of rounded shape.

The invention concerns a method for manufacturing a fibrous preform using said tooling described above, comprising at least:
  winding the fibrous fabric on the support about a first winding axis by gradually reducing the distance between the end regions along the second axis to predetermined values during winding, until the support is caused to change over to the retracted configuration,
  first compaction of the winding at the end regions by the first compaction device, with the support in retracted configuration,
  change-over of the support from the retracted configuration to the extended configuration, after the first compaction, by increasing the distance between the end regions along the second axis so as to tauten the winding in the central region, and
  second compaction of the winding in the central region by the second compaction device with the support in extended configuration.

In one example of embodiment, the first compaction comprises the performing of compaction by the first compacting element on the distal ends of the winding, followed by performing of compaction on the side portions of the end regions by the second compacting element with the compacting component directed towards the central region.

In one example of embodiment, the fibrous fabric is obtained by three-dimensional weaving.

In one example of embodiment, the fibrous fabric has an area of reducing thickness adjacent to each of the ends thereof.

Said characteristic advantageously prevents having a sudden local variation in fibre volume fraction at the start and end winding points.

The invention also concerns a method for manufacturing a part in composite material, comprising at least:
  fabricating a fibrous preform by implementing a method such as described above, and
  forming a matrix in a porosity of the fibrous preform just fabricated to obtain a part in composite material.

The matrix can typically be formed by introducing a matrix material into the porosity of the fibrous preform, followed by curing the matrix material. It is possible to inject a resin into the porosity of the fibrous preform and to crosslink this resin to obtain the matrix. The formed part can be in a composite material with organic matrix or, as a variant, a composite material with ceramic matrix.

DESCRIPTION OF EMBODIMENTS

FIGS. 3 to 6 illustrate an example of the invention intended to produce a part having elongate geometry, such as a landing gear strut or brake bar. The invention remains applicable to other types of parts as is described below in connection with FIG. 9.

The paragraphs below detail the determining of the length of the fabric to be wound on each turn or fraction of a turn, as a function of the part under consideration. Initially, the dimensions of the part to be obtained are known (after compacting), namely the length and thickness thereof in particular, as well as the desired fibre volume fraction.

The initial thickness of the fabric is also known (before compacting) which is said to be «bulked» as indicated above with a fibre volume fraction generally less than the desired fibre volume fraction for the part. The number of winding turns of the fabric to be carried out corresponds to the number of turns to obtain the desired thickness and fibre volume fraction in the end part, taking into consideration bulking of the fabric.

The overlengths generated in the central region, when compacting the end regions, are geometrically calculated for each layer of the winding. These overlengths vary as a function of the position of the wound layer within the overall thickness as indicated above and schematized in FIG. 1. The length is then inferred therefrom that is to be chosen for the winding of each layer of fabric, hence the distance separating the end regions to be chosen for each turn or fraction of a turn, so as to obtain the desired length for the end part without any wrinkling of the fabric after contribution of the overlengths generated when compacting the end regions.

At a preliminary step of winding, the fibrous fabric 12 is first obtained by techniques known per se. The fibrous fabric 12 can be formed by three-dimensional weaving obtaining properties of the fabric which remain invariant over the entire dimension of the fabric 12, or causing changes in at least one from among the weave, ratio of warp/weft yarns, or materials used for the woven yarns depending on the envisaged application.

Figure 3:
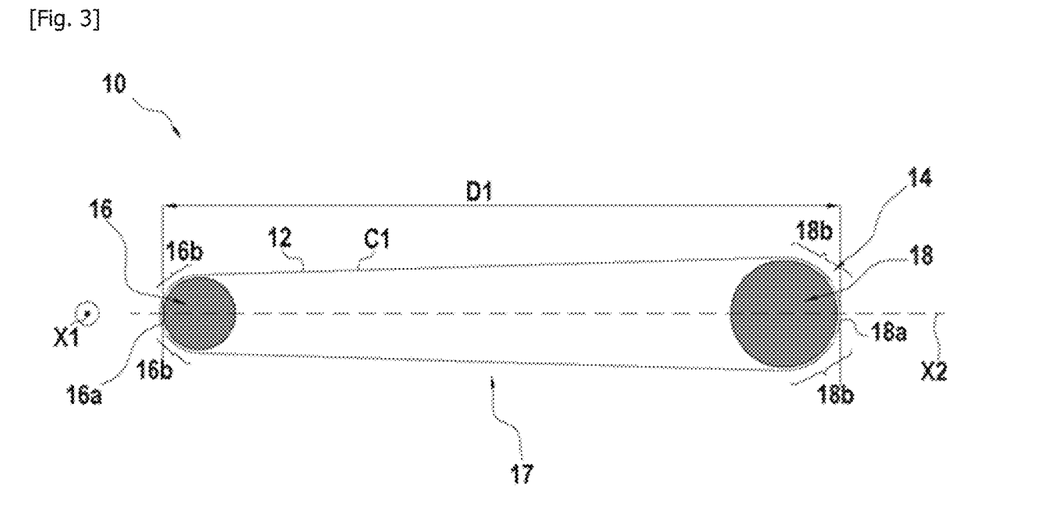
FIG. 3 schematically illustrates the first turn of winding of a fibrous fabric in one example of the invention.

The winding of the fabric 12 is initiated using the tooling 10 in the configuration illustrated in FIG. 3. The tooling 10 generally comprises a support 14 around which the fabric 12 is intended to be wound. This winding is performed about a first winding axis X1 normal to the plane of the Figure. The support 14 defines end regions 16 and 18, which here are two in number and are spaced along a second axis X2 which is transverse e.g. perpendicular to the first axis X1. The end regions 16, 18 each comprise a distal end 16a, 18a here forming a «nose» of these regions 16, 18, as well as side portions 16b, 18b located on the side of the central region 17, with the distal end 16a, 18a contained between two side portions 16b, 18b. The end regions 16, 18 define a loop or corner around which the orientation of the fabric 12 is modified, the fabric making a U-turn around each end region 16, 18 during winding in the illustrated example. The end regions 16, 18 can be of convex shape as illustrated. In the illustrated example, the end regions 16, 18 cross-sectionally relative to the first axis X1, form a rounded shape for example substantially circular and of different dimensions. An example of a support is illustrated having two end regions 16, 18, but it would nevertheless lie within the scope of the invention if the support had more than two end regions defining corners around which the fabric is intended to be wound. In the illustrated example, when winding the fabric 12, the central region 17 does not have any portion on which the wound fabric is supported, but it would lie within the scope of the invention if this were the case as is described below.

The first turn is wound, leading to winding of the first layer C1 of the fibrous fabric 12 around the support 14, setting the distance between the end regions 16, 18 at the initial value D1 (FIG. 3). The distance between the end regions 16, 18 can correspond as illustrated to the distance between the distal ends 16a and 18a measured along the second axis X2. Initially, one end of the fabric is attached to the support 14, for example at a point of the central region 17, by means of an attaching device of the preform (not illustrated) such as clamping means. This attaching can be obtained by various methods, for example using an adhesive tape or by clamping. It is also possible to provide the support and the fabric with position indicators, for example by providing the fabric with an identifying element intended to be placed over a predetermined position on the support 14, to confirm that winding of the fabric 12 is properly carried out. As a variant or in combination, the fabric 12 can be provided with mechanical elements intended to cooperate with mechanical elements provided on the support 14, to confirm the proper positioning of the fabric 12 such as systems of hooks and rings. The first turn forming the first layer C1 of the winding is carried out by tensioning the fabric 12 to prevent the onset of wrinkling as illustrated in FIG. 3. Once the first turn is completed, the first layer C1 can be temporarily held in place, for example at the end regions 16, 18, even at the distal ends 16a, 18a. This temporary holding in position can be obtained using any suitable device, for example by clamping, optionally by means of the compacting element 22 (described in connection with FIG. 5 below).

The tooling 10 comprises a motion device (not illustrated) which is able to modify the shape of the support during winding. Once the first turn of winding is completed, the motion device draws the end regions towards each other along the second axis X2, and the distance between these regions 16, 18 is set at a predetermined value resulting from the geometric model described above so that winding of the second layer of the fabric 12 can take place in similar manner to winding of the first layer C1, and the regions 16, 18 are thereafter drawn closer at each turn of the winding until reaching the configuration illustrated in FIG. 4 after winding of the last layer Cn of the fabric 12. This configuration corresponds to the retracted configuration of the support in which the distance between the end regions 16, 18 is minimal of value D2. In the example under consideration, the drawing closer of the regions 16, 18 is carried out at each turn, but it would nevertheless remain within the scope of the invention if this drawing closer is carried out at each fraction of a turn, for example at each U-turn. The motion device is configured to allow an incremental reduction in the distance between the end regions 16, 18, and comprises a position locking mechanism allowing the setting of the desired distance between the end regions 16, 18 for the turn under consideration. Persons skilled in the art are able to determine that various motion systems can be suitable, using motion systems such as screws or jacks. It will be noted in FIG. 4 that it is possible that the last layer Cn of the winding, before compaction, does not exhibit any noteworthy wrinkling, however due to the gradual reduction in the distance between the end regions 16, 18 as and when winding progresses, the lower layers do exhibit wrinkling once winding is completed (see wrinkling P1 for layer C1 and wrinkling Pn−1 for the second to last layer Cn−1). This wrinkling is more pronounced the more a layer lies innermost within the winding.

Figure 4:
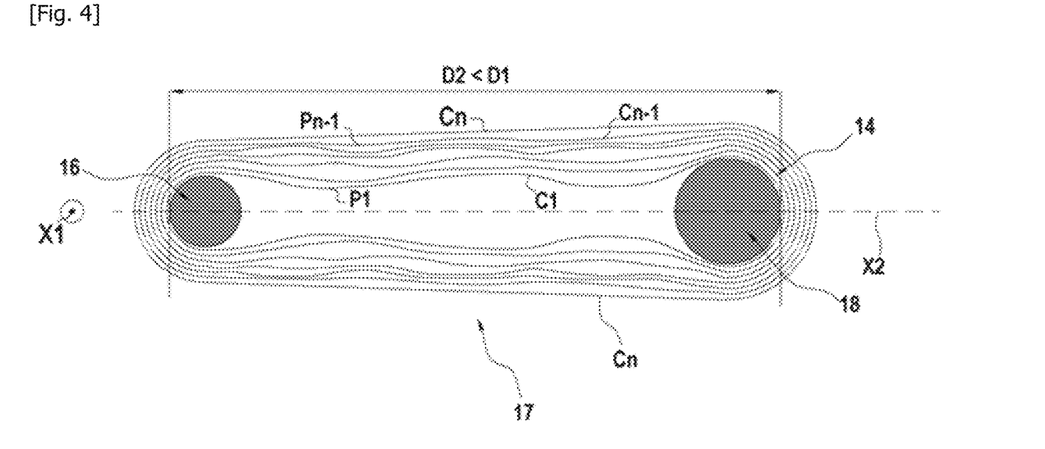
FIG. 4 schematically illustrates the fibrous fabric on completion of winding in the example of the invention, with the centre distance of the tooling in retracted configuration.

Once winding is completed, the support is in the retracted configuration in FIG. 4, and compaction of the fabric wound in several layers C1-Cn is initiated.

Figure 5:
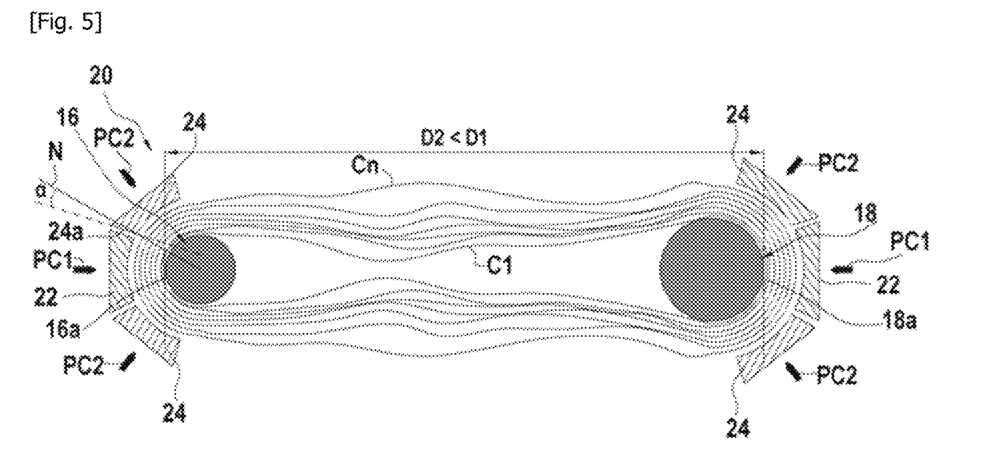
FIG. 5 schematically illustrates the compacting of the wound fibrous fabric on the end regions of the support by the first compaction device, in the example of the invention, with the centre distance of the tooling in retracted configuration.

Compaction takes place in several steps and starts first by compacting the winding C1-Cn at the end regions 16, 18. This compaction is illustrated in FIG. 5. This compaction uses a first compaction device 20 which in the illustrated example comprises several compacting elements 22, 24 which can be of varied shape as a function of the desired shape of the compressed winding, and for example in block or slab form. The first compaction device 20 compacts the winding C1-Cn while the support is set in the retracted configuration as illustrated in FIG. 5. In the illustrated example, this compaction is performed portion be portion by first compacting the winding C1-Cn at the distal ends 16a, 18a by means of a first compacting element 22 (application of compacting pressure in the direction of arrow PC1), followed by compacting of the side portions 16b, 18b by means of a second compacting element 24 (application of compacting pressure in the direction of arrow PC2 with one component towards the central region) differing from the first compacting element 22. The second compacting element 24 has at least one lateral surface 24a forming a nonzero angle $\alpha$ with the normal N to the winding C1-Cn at this surface 24a. Compaction on the end regions 16, 18 can be carried out symmetrically relative to the second axis X2. It would lie within the scope of the invention if compaction at the distal ends 16a, 18a and at the side portions 16b, 18b is carried out simultaneously with one same compacting element on each end region 16, 18, and not with several different elements 22, 24 such as illustrated. In general, it will be noted that compaction can be performed by applying a predefined compacting pressure or by imposing a predefined movement.

Figure 6:
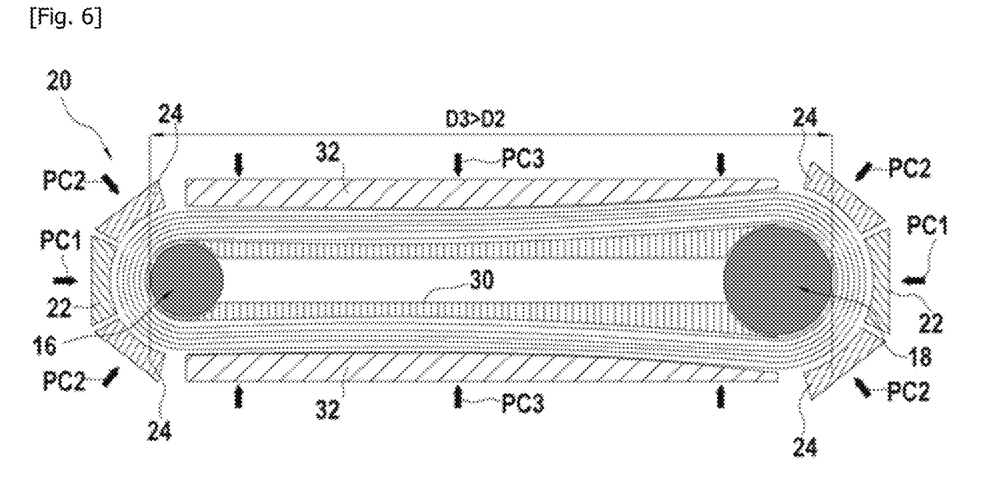
FIG. 6 illustrates the changeover to the extended configuration and compaction by the second compaction device in this configuration, in the example of the invention.

FIG. 5 illustrates the overlengths generated for the different winding layers C1-Cn after compacting of the end regions 16, 18. As previously indicated, a longer overlength is observed for the last layer Cn compared with the first C1. Once compaction has been performed on the end regions 16, 18, these regions 16, 18 are again drawn apart by the motion system until they are separated by a third distance D3 greater than the second distance D2 (FIG. 6). In this case, the support changes over to the extended configuration. The third distance D3 can correspond to a desired dimension of the part to be obtained, for example to the desired length thereof. It will be noted that the third distance D3 can be greater than the initial distance D1 to take into account the overlength generated at the first layer C1 at the time of compaction by the first compaction device. In the extended configuration, the layers C1-Cn are again tautened on the central region 17 to eliminate previously onset wrinkling. Compaction with the second compaction device 32 is then carried out. This compaction, in the illustrated example, is preceded by the insertion of a base 30 intended to support the winding C1-Cn when being compacted by the second compaction device 32. Compaction is then applied in the direction of arrows PC3 to conform the winding C1-Cn on the central region 17. It will be noted that it is possible to maintain compaction by the first compaction device 20 during this conformation, as illustrated in FIG. 6, or as a variant to release this compaction.

The tooling 10 comprises a control unit (not illustrated) able to control the motion device and compaction devices 20, 32.

A description has just been given of an example of forming a fibrous reinforcement of a part in composite material having the desired dimensions and the desired fibre volume fraction. The following description in connection with FIGS. 7 and 8 sets out to describe variants of the invention for the fabrication of parts also having elongate geometry.

Figure 7:
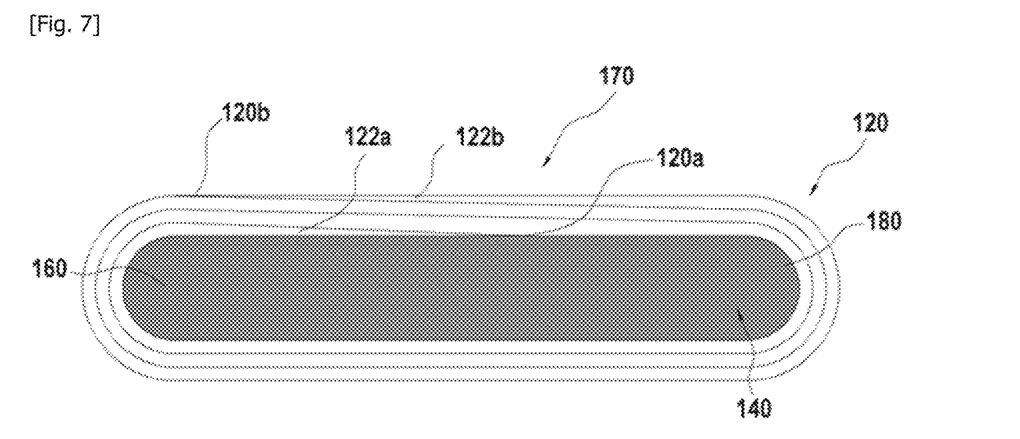
FIG. 7 schematically illustrates a detail of a variant of fibrous fabric able to be used in the invention.

In the variant in FIG. 7, the fabric 120 wound on the support 140 is not of constant thickness. The fabric is initially attached to the support, for winding thereof, at a first longitudinal end 120a. The thickness of the fabric increases from the first end 120a and then decreases in the direction of second longitudinal end 120b. The fabric has zones of decreasing thickness 122a and 122b which are adjacent to the ends 120a and 120b and is of reduced thickness as it approaches these ends 120a and 120b. Zone 122b is advantageously superimposed over zone 122a so that it has the same number of fibres in the weave all around the part, once winding is completed. FIG. 7 also illustrates the case of a support 140 extending over the central region 170 between the end regions 160, 180 right at the start of the winding operation. In this Figure, a support 140 is illustrated of substantially rectilinear shape on the central region 170, but it would remain within the scope of the invention if this were not the case, the support as a variant possibly having a concave shape in this region, for example diabolo-shaped as seen in cross section relative to the winding axis X1.

Figure 8:
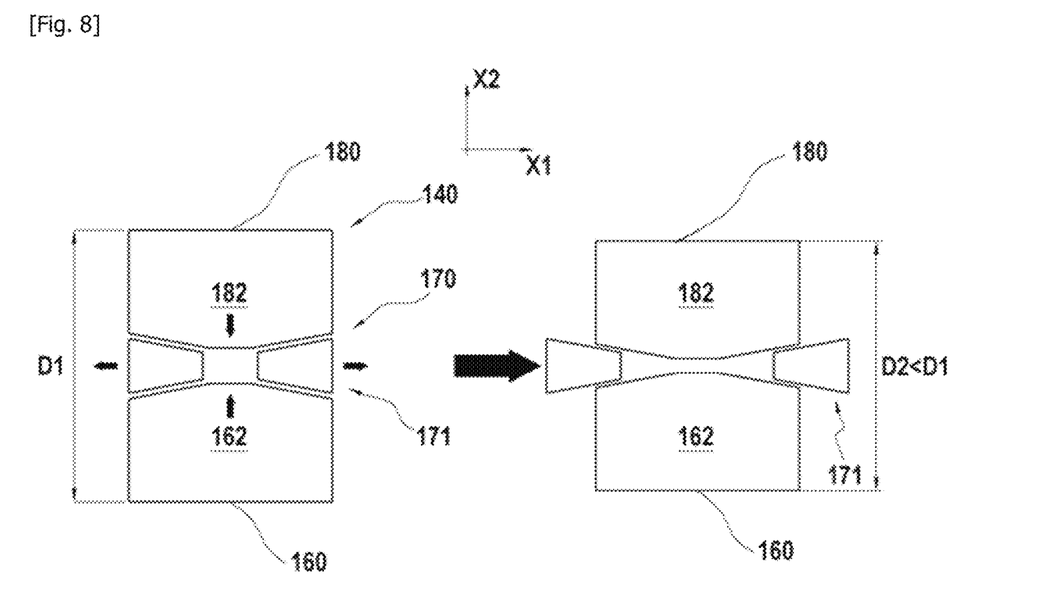
FIG. 8 schematically illustrates the changeover to the retracted configuration according to one variant of the invention.

FIG. 8 shows the relative movement of the end regions 160, 180 in one alternative. The support 140 may comprise two portions 162 and 182 each comprising one of the end regions 160 or 180 and extending over the central region 170, and an adjustment device composed of two elements 171 that are mobile along the winding axis X1 to impart a changing width to the adjustment device along this axis. By drawing apart the elements 171 along the winding axis X1, the portions 162 and 182 can be drawn towards each other and hence also the end regions with changeover to the retracted configuration. Changeover to the extended configuration is obtained with a reverse movement.

The matrix is then formed in the porosity of the fibrous reinforcement using techniques known per se, for example via injection of resin followed by crosslinking thereof. If desired, it is noted that it is possible to add to the wound fibrous reinforcement, formed by the technique of the invention, an additional fibrous reinforcement for example in an inner space delimited by the wound fibrous reinforcement, and thereafter to carry out joint densification of these two fibrous reinforcements to obtain the part in composite material. As a variant, these fibrous reinforcements can be densified separately and subsequently joined to form the part.

Figure 9:
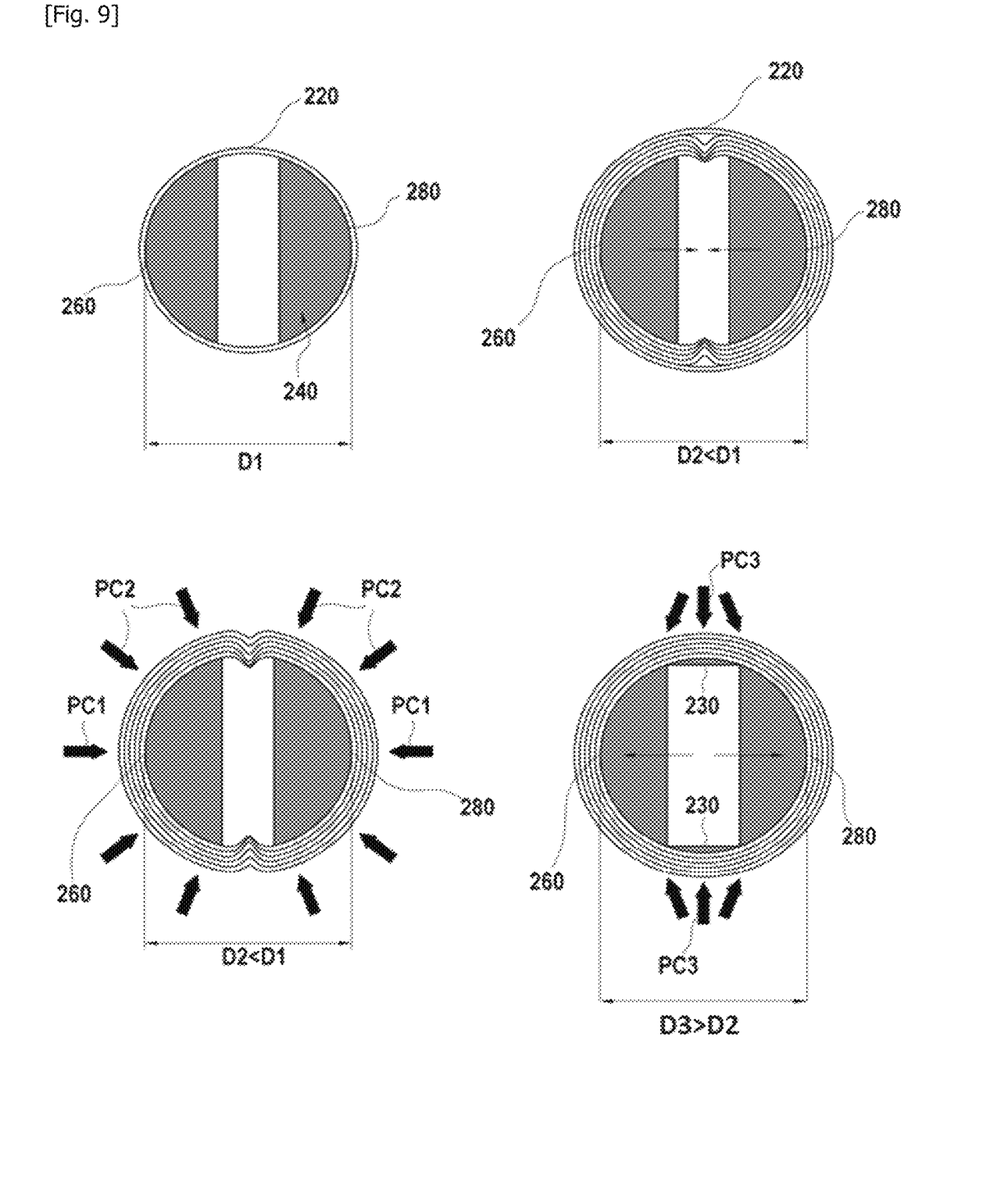
FIG. 9 schematically illustrates a variant of tooling according to the invention, adapted for the fabrication of a casing for gas turbine engine.

A description has just been given in connection with FIGS. 3 to 8 of the fabrication of parts having elongate geometry. FIG. 9, which will now be described, concerns the case of a part having geometry that is substantially circular, here a casing for gas turbine engine.

In the example in FIG. 9, a support 240 is used comprising two truncated rolls each defining an end region 260 and 280. Winding of the fabric 220 is started with the end regions 260 and 280 spaced apart by a first distance D1. The end regions 260 and 280 are gradually drawn close as and when winding progresses in similar manner to the description given above. Once in the retracted configuration (distance between the end regions 260, 280 equal to D2), compaction PC1, PC2 is carried out on the end regions 260, 280 as described above. The support then changes over to the extended configuration (distance D3 greater than D2 separating the end regions 260, 280) and compaction PC3 is then carried out on the central region after the addition of a support 230 to underpin the winding.

It will be appreciated by persons skilled in the art that the invention can find application to other types of parts, such as other gas turbine parts in particular outlet guide vanes.

The invention claimed is:

1. A tooling for winding a fibrous fabric, comprising:
at least one support on which the fibrous fabric is intended to be wound about a first winding axis, the at least one support having at least two end regions spaced apart along a second axis transverse to the first axis,
a motion device configured to modify a shape of the at least one support between a retracted configuration and extended configuration by gradually drawing closer or drawing apart the end regions along the second axis said support having an elongated shape along the second axis, and
a first compaction device configured to perform compaction on the end regions at least in the retracted configuration and a second compaction device, differing from the first compaction device, configured to perform compaction on a central region lying between the end regions in the extended configuration, and wherein each end region comprises a distal end and two side portions positioned either side of the distal end and located on the side of the central region, and wherein the first compaction device comprises a first compacting element having a first compacting surface configured to perform compaction on the distal end of each end region and a second compacting element having a second compacting surface configured to perform compaction on the side portions of each end region with a compacting component directed towards the central region wherein the second compacting element has at least one lateral surface forming a non-zero angle with the normal to the support at this surface, said non-zero angle being at a joint between the first and second compacting surfaces.

2. The tooling according to claim 1, wherein the first compaction device is configured to carry out compaction by the second compacting element after performing compaction by the first compacting element.

3. The tooling according to claim 1, wherein the end regions define a winding surface having a rounded shape.

4. The tooling according to claim 1, wherein the at least one lateral surface forming a nonzero angle with the normal to the support is configured and arranged to make contact with the fibrous fabric.

5. The tooling according to claim 1, wherein the tooling further comprises
one or more clamps adapted to attach the fibrous fabric to the support.

6. The tooling according to claim 1, wherein the tooling further comprises
the fibrous fabric and wherein said fibrous fabric is formed by three-dimensional weaving.

7. The tooling according to claim 1, wherein said end regions form, cross-sectionally relative to the first axis, respective shapes having different dimensions.

8. A method for manufacturing a fibrous preform using tooling for winding a fibrous fabric, comprising at least one support on which the fibrous fabric is intended to be wound about a first winding axis, the at least one support having at least two end regions spaced apart along a second axis transverse to the first axis, the tooling comprising a motion device configured to modify a shape of the support between a retracted configuration and an extended configuration by gradually drawing closer or drawing apart the end regions along the second axis said support having an elongated shape along the second axis, and comprising a first compaction device configuration to perform compaction on the end regions at least in the retracted configuration and a second compaction device, differing from the first compaction device, configuration to perform compaction on a central region lying between the end regions in the extended configuration, and wherein each end region comprises a distal end and two side portions positioned either side of the distal end and located on the side of the central region, and wherein the first compaction device comprises a first compacting element having a first compacting surface configured to perform compaction on the distal end of each end region and a second compacting element having a second compacting surface configured to perform compaction on the side portions of each end region with a compacting component directed towards the central region wherein the second compacting element has at least one lateral surface forming a non-zero angle with the normal to the support at this surface, said non-zero angle being at a joint between the first and second compacting surfaces the method comprising:
winding the fibrous fabric on the at least one support about the first winding axis by gradually reducing a distance between the end regions along the second axis to predetermined values during winding until the support is caused to change over to the retracted configuration;
first compacting the winding at the end regions by the first compaction device with the support in retracted configuration;
performing a changeover of the support from the retracted configuration to the extended configuration, after the first compaction, by increasing the distance between the end regions along the second axis to tauten the winding in the central region; and
second compacting the winding in the central region by the second compaction device with the support in extended configuration.

9. The method according to claim 8, wherein the first compaction comprises performing of compaction by the first compacting element on the distal ends of the end regions, followed by performing of compaction on the side portions of the end regions by the second compacting element with the compacting component directed towards the central region.

10. The method according to claim 8, wherein the fibrous fabric is obtained by three-dimensional weaving.

11. The method according to claim 8, wherein the fibrous fabric has a zone of decreasing thickness adjacent to each of the ends thereof.

12. A method for manufacturing a part in composite material comprising:
fabricating a fibrous preform by implementing a method according to claim 10, and
forming a matrix in a porosity of the fibrous preform just fabricated to obtain the part in composite material.

13. A tooling for winding a fibrous fabric, comprising at least one support on which the fibrous fabric is intended to be wound about a first winding axis,
the support having at least two end regions spaced apart along a second axis transverse to the first axis,
wherein it comprises a motion device configured to modify the shape of the support between a retracted configuration and extended configuration by gradually drawing closer or drawing apart the end regions along the second axis, said support having an elongated shape along the second axis, and wherein it comprises a first compaction device able to perform compaction on the end regions at least in the retracted configuration and a second compaction device, differing from the first compaction device, able to perform compaction on a central region lying between the end regions in the extended configuration, and wherein each end region comprises a distal end and two side portions positioned either side of the distal end and located on the side of the central region, and wherein the first compaction device comprises a first compacting element able to perform compaction on the distal end of each end region and a second compacting element able to perform compaction on the side portions of each end region with a compacting component directed towards the central region, and wherein the tooling further comprises one or more clamps adapted to attach the fibrous fabric to the support.

14. The tooling according to claim 13, wherein the tooling comprises a first clamp adapted to attach the fibrous fabric on the central region, and a second clamp adapted to attach the fibrous fabric at at least one of the end regions.

15. The tooling according to claim 13, wherein said end regions form, cross-sectionally relative to the first axis, respective shapes having different dimensions.

* * * * *